United States Patent [19]

Herrera

[11] 4,184,654
[45] Jan. 22, 1980

[54] ROTOR AIRCRAFT

[76] Inventor: Samuel M. Herrera, 2430 Marengo St., Los Angeles, Calif. 90033

[21] Appl. No.: 918,935

[22] Filed: Jun. 26, 1978

[51] Int. Cl.² ............................................. B64C 27/02
[52] U.S. Cl. ........................................... 244/8; 46/82; 46/75; 244/12.2; 244/17.11; 416/171
[58] Field of Search ..................... 244/12.2, 23 C, 7 R, 244/8, 6, 17.11, 138 A; 46/86 R, 75, 74 R, 82–85, 78, 74 D, 76, 76 A; 416/140, 197 A, 171

[56] References Cited

U.S. PATENT DOCUMENTS

| 196,448 | 10/1877 | Harris | 416/197 A |
|---|---|---|---|
| 204,728 | 6/1878 | Haskins | 416/140 |
| 1,824,195 | 9/1931 | Chillingworth | 416/171 |
| 2,931,132 | 4/1960 | Griessl | 46/75 |
| 3,193,214 | 7/1965 | Hollingsworth | 244/12.2 |
| 3,514,053 | 5/1970 | McGuinness | 244/12.2 |
| 3,632,065 | 1/1972 | Rosta | 244/12.2 |

FOREIGN PATENT DOCUMENTS

| 1781143 | 9/1970 | Fed. Rep. of Germany | 416/171 |
|---|---|---|---|
| 2042285 | 3/1972 | Fed. Rep. of Germany | 46/75 |
| 2263698 | 7/1973 | Fed. Rep. of Germany | 244/12.2 |
| 831845 | 4/1960 | United Kingdom | 46/75 |

*Primary Examiner*—Galen L. Barefoot
*Attorney, Agent, or Firm*—Howard I. Podell

[57] ABSTRACT

An aircraft useful as a toy or as a personal craft which includes a plurality of blades freely rotatably mounted on a spherical body supported by landing means. The blades are hinged onto arms to swing up and down for upward flight or downward landing. Funnel members are mounted at the end of the arms to act as counterweights and drag propellers. A rocket is mounted under the body for vertical take-off and will rotate the blades. When the rocket shuts off, the blades will swing up and down to feather the aircraft. A pair of rockets are mounted also on the body under the blades for horizontal thrust. The aircraft can take-off vertically or horizontally and lands without power like a parachute.

3 Claims, 4 Drawing Figures

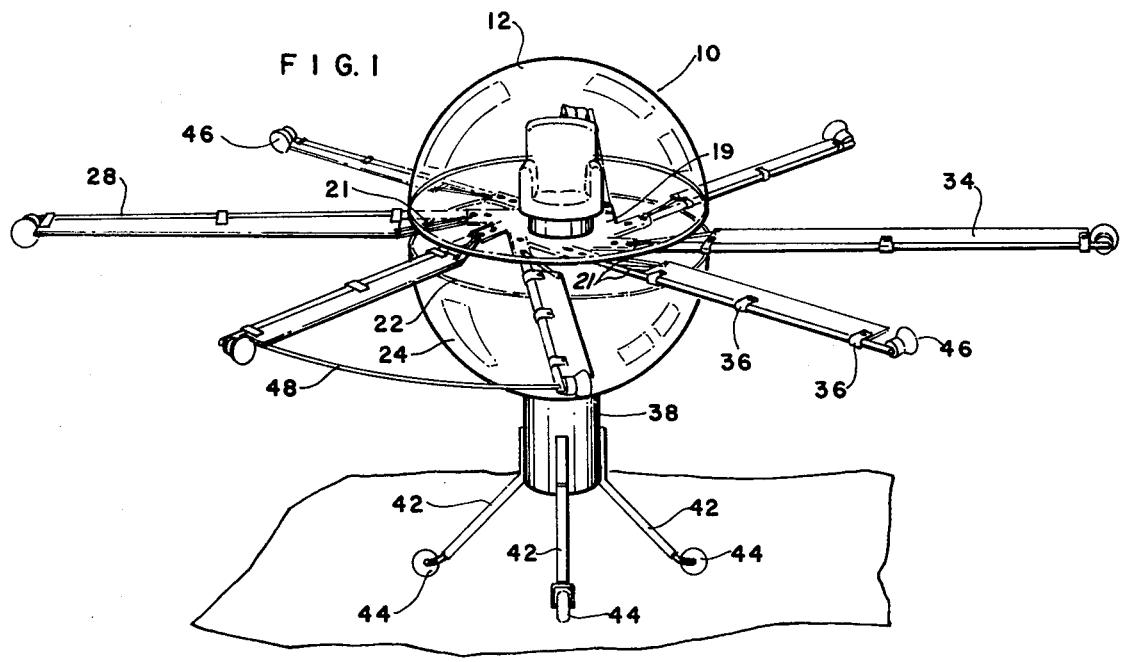
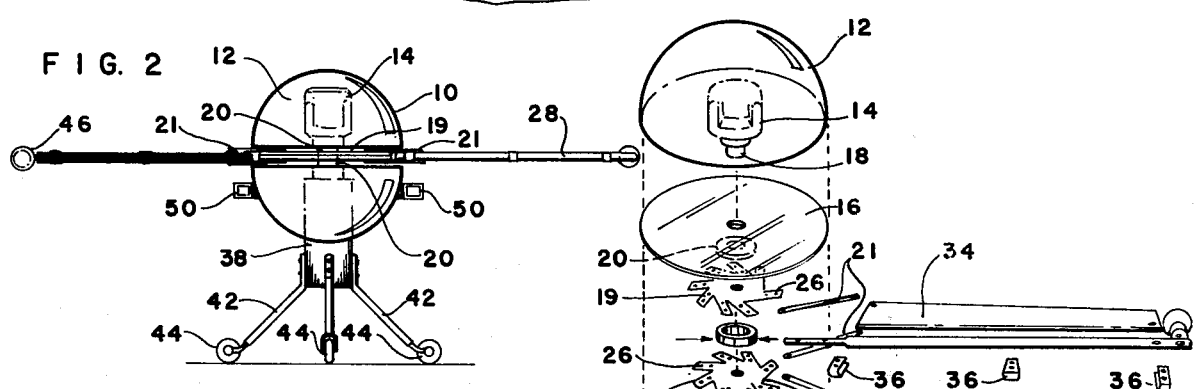
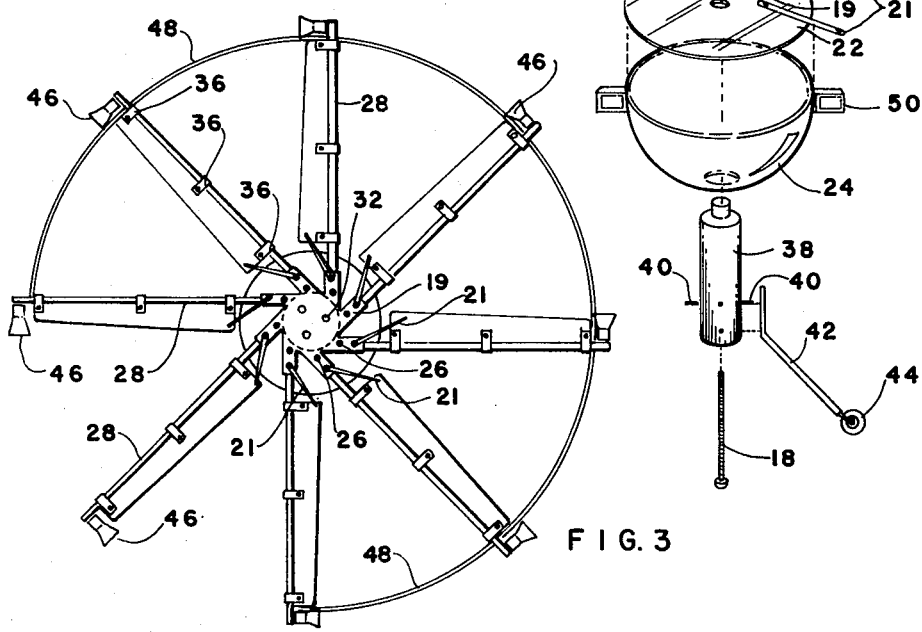
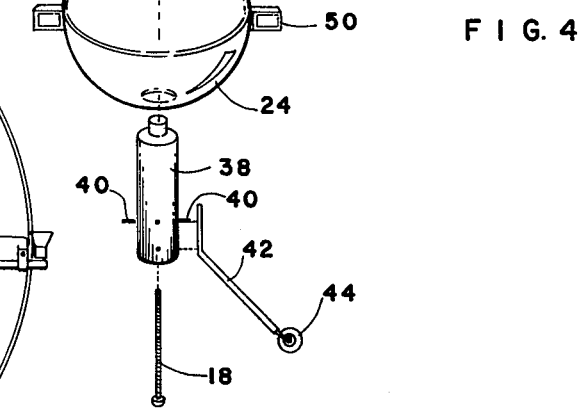

ROTOR AIRCRAFT

FIELD OF THE INVENTION

This invention relates generally to a toy or one-man rocket propelled aircraft.

DESCRIPTION OF THE PRIOR ART

The prior art, as exemplified by U.S. Pat. No. 3,229,413; 3,375,606; 2,545,586; 3,229,417 and 2,630,321 is generally illustrative of the pertinent art but the aforementioned patents are non-applicable to the present invention. While the prior art expedients are generally acceptable for their intended purposes only, they have not proven entirely satisfactory in that they are either complex and expensive to manufacture, or to use, or to operate. As a result of the shortcomings of the prior art, typified by the above, there has developed a substantial need for improvement in this field.

The principal object of this invention is to provide a device or article of this character which combines simplicity, strength and durability in a high degree, together with inexpensiveness of construction so as to encourage widespread use thereof.

Other objects of this invention will in part be obvious and in part hereinafter pointed out.

The invention accordingly consists in the features of construction, combinations of elements, and arrangement of parts which will be exemplified in the construction hereinafter described, and of which the scope of application will be indicated in the following claims.

SUMMARY OF THE INVENTION

This invention resides in an aircraft useful as a toy or as a personal craft which includes a plurality of blades freely rotatably mounted on a spherical body supported by landing means. The blades are hinged onto arms to swing up and down for upward flight or downward landing. Funnel members are mounted at the end of the arms to act as counterweights and drag propellers. A rocket is mounted under the body for vertical take-off and will rotate the blades. When the rocket shuts off, the blades will swing up and down to feather the aircraft. A pair of rockets are mounted also on the body under the blades for horizontal thrust. The aircraft can take-off vertically or horizontally and lands without power like a parachute.

BRIEF DESCRIPTION OF THE DRAWING

In the accompanying drawing, in which is shown one of the various possible illustrative embodiments of this invention, wherein like reference character identify the same or like parts:

FIG. 1 is an isometric view of the aircraft of the invention;

FIG. 2 is a front elevation thereof;

FIG. 3 is a top planar view of same; and

FIG. 4 is a partial exploded view thereof.

DESCRIPTION OF THE PREFERRED EMBODIMENT

With reference to the drawing, there is shown and illustrated an aircraft constructed in accordance with the principles of the invention and designated generally by reference character 10. The illustrated tangible embodiment of the invention includes an upper hemispherical transparent cockpit 12 covering a seat 14 and mounted on plastic floor 16 through a common threaded metal rod 18 and secured thereto by nuts (not shown). Floor 16 is separated from multi-armed metal or aluminum plate 19 by spacer 20. An identical plate 19 is separated by a spacer 20 from the circular to member 22 of lower hemisphere 24, both being fitted on rod 18 and member 22 being held thereon by nuts threaded above and below it.

A plurality of registering openings 26 are drilled in the horizontally extending arms of superposed plates 19 for the passage of rivets securing the inward end of metal tubes 28. Plates 19 are secured to ball bearing 30 by rivets or bolts 32. As shown in FIGS. 1 and 2, rods 28 are aligned with ball bearing 30. Foldably mounted on rods 28 are at least two rotor blades 34 which are held thereon by metal clamps 36. Secured on plates 19 above and below blades 34 are horizontally extending tubular stops 21. In a manned craft, these would be controlled by wires leading to controls in the cockpit. In the embodiment shown, stops 21 are inclined as represented at an acute angle to limit the upward and downward course of blades 34.

Below hemispherical member 24 is a cylindrical body 38 adapted to receive and hold a rocket of conventional design. Secured by screws or rivets 40 to body 38 are metal landing brackets 42 at whose lower ends are rotatably mounted wheels 44. At the end of each rod and facing in the same direction as the leading edges of the blades 34 are metal funnels 46 serving as counterweights and as drag propellers during horizontal flight.

Optionally and for improved stability a circular tubular member 48 has an end fitting between each funnel 46 and the tip of one of each blade around the craft.

To make this craft fly, it is necessary to install a rocket inside cylinder 38, then ignite the wick with a cigarette already lighted or with an electric device (that also is sold at any hobby shop). When the gun powder from the rocket starts shooting out the already burnt powder, the craft will take off vertically, as the blades 34 rotate. Immediately then, when it reaches certain altitude, the rocket will shut off. The craft will tend to come down but at that particular moment the blades 34 will automatically flop up to keep the rotor turning at the same direction that they already were turning before the craft comes down as safely as if it was a parachute.

To make this craft fly horizontally, it is necessary to install two Jet-Tex Rockets 50 horizontally opposite to each other on sphere 24 close to the thin metal circle 22 without interfering with the turning of the rotor. The counterweight funnels take over on the turning of the rotor to keep the model flying while the pellets from the Jet-Tex run out then the model will tend to come down vertically and the blades 34 again will take over at this particular moment in order to make a safely landing. In a manned craft, control means for the rockets are provided.

The operation and use of the invention hereinabove described will be evident to those skilled in the art to which it relates from a consideration of the foregoing.

It will thus be seen that there is provided a device in which the several objects of this invention are achieved, and which is well adapted to meet the conditions of practical use. Its advantages are easily seen.

It is thought that persons skilled in the art to which this invention relates will be able to obtain a clear understanding of the invention after considering the foregoing description in connection with the accompanying drawing. Therefore, a more lengthy description is deemed unnecessary.

It is to be understood that various changes in shape, size and arrangement of the elements of this invention as claimed may be resorted to in actual practice, if desired.

Having thus described the invention, what is claimed as new and to be secured by Letters Patent is:

1. An aircraft comprising a spherical body composed of hemispherical upper and lower halves; a plurality of freely rotating blades mounted between said halves each blade being pivoted on a horizontal arm for vertical movement thereon; stops above and below said blades for limiting said movement; funnel-shaped counterweights mounted at the end of said arms and having their open ends directed in the same direction as the leading edges of said blades; a tubular vertical member adapted to hold a rocket therein for vertical propulsive motion; said lower hemisphere being secured to said member; a landing gear secured to said member and horizontally disposed rockets on each side of said lower hemisphere.

2. The invention as recited in claim 1, further including a circular member connecting the outward ends of said arms.

3. The invention as recited in claim 1, wherein said upper hemisphere forms the cockpit of said aircraft.

* * * * *